INVENTOR
WILLIAM S. GUBELMANN,
DECEASED
BY WALTER S. GUBELMANN, EXECUTOR
BY
Burgess, Ryan & Hicks
ATTORNEYS

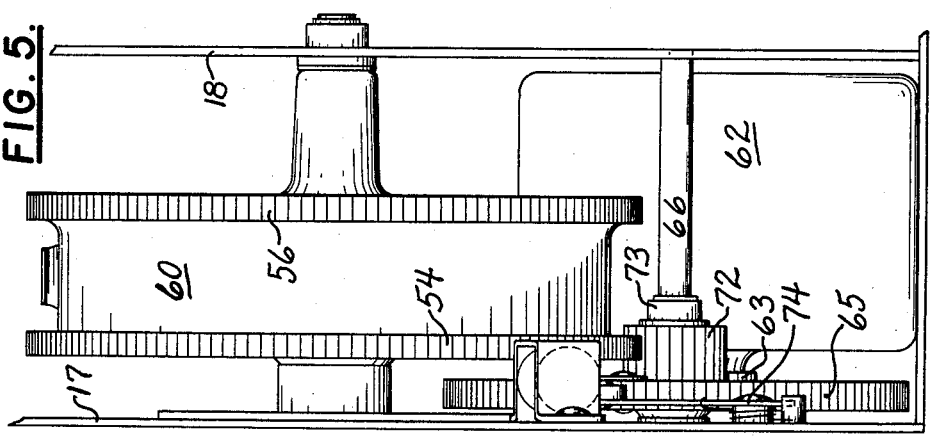
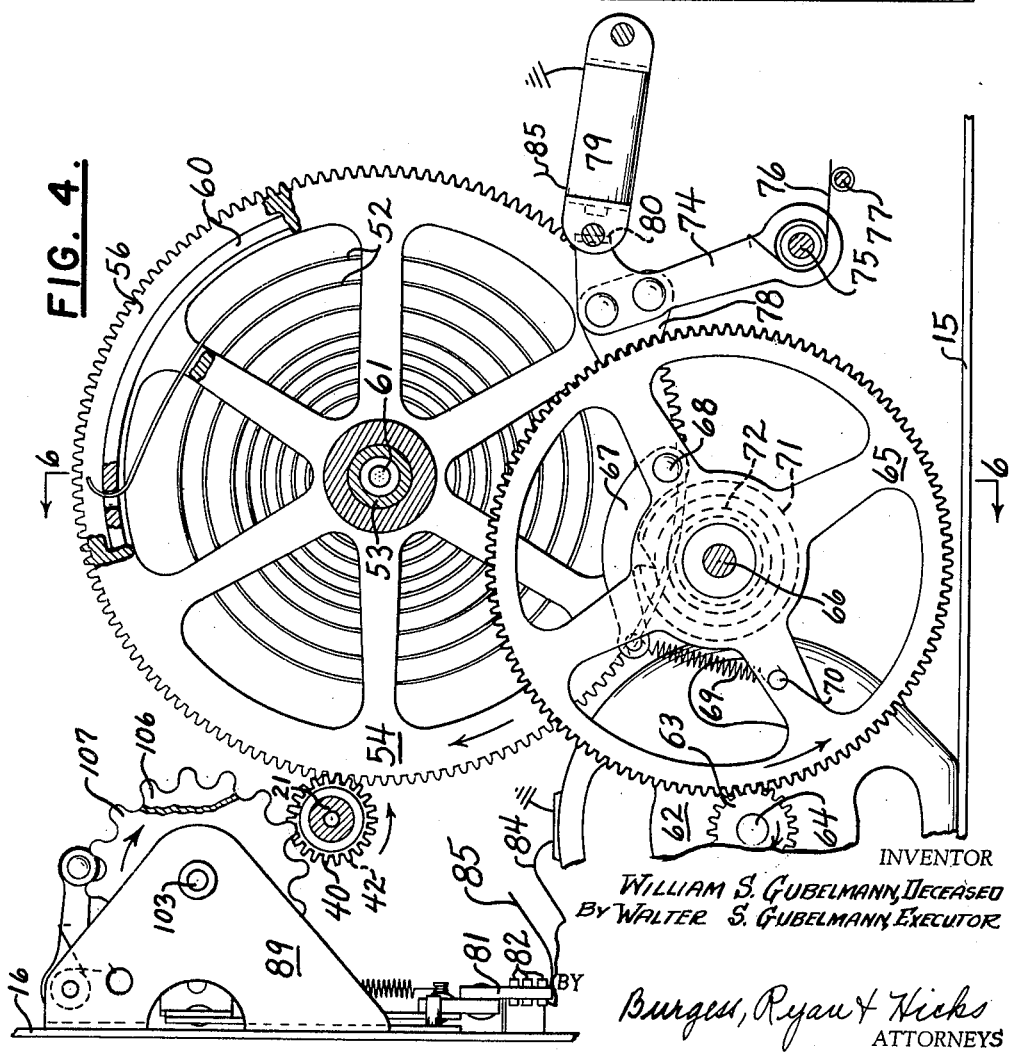

FIG. 6.
FIG. 7.
FIG. 8.
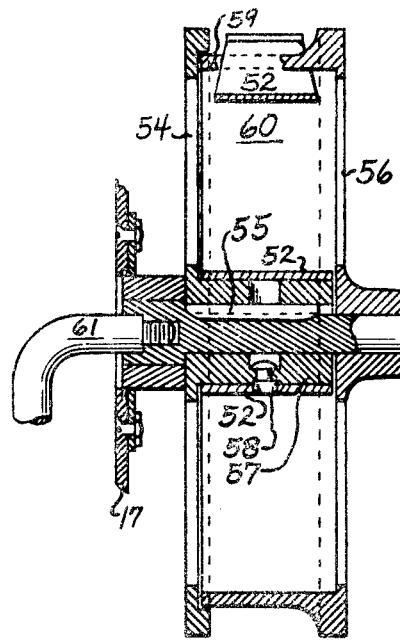
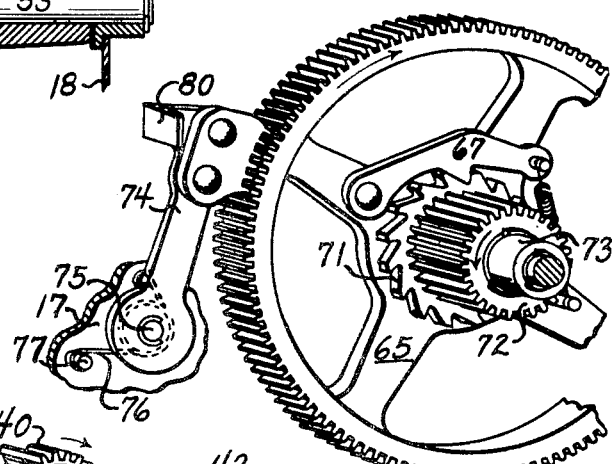
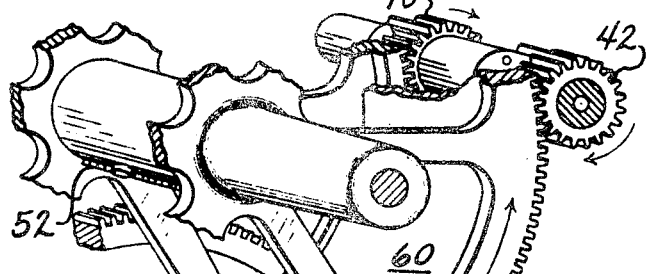
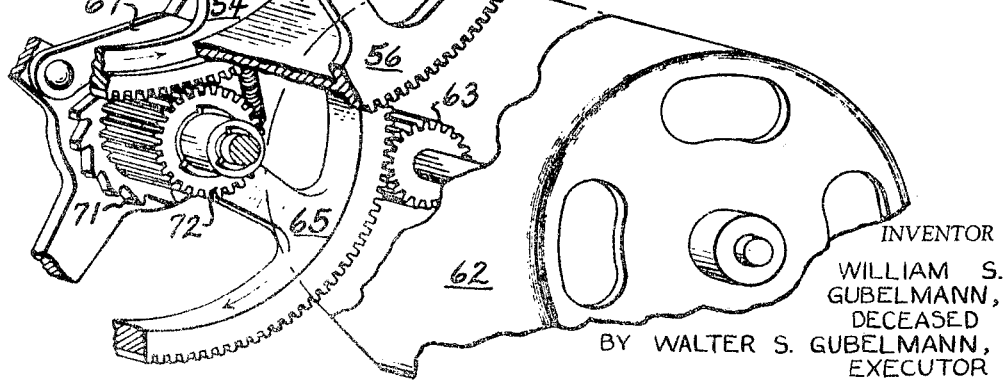
INVENTOR
WILLIAM S. GUBELMANN, DECEASED
BY WALTER S. GUBELMANN, EXECUTOR
BY Burgess, Ryan & Hicks
ATTORNEY June 22, 1965  W. S. GUBELMANN  3,190,394
SPRING MOTOR, WITH MOTOR REWIND FOR
CALCULATING MACHINES AND THE LIKE
Original Filed Nov. 6, 1950  6 Sheets-Sheet 6

INVENTOR
WILLIAM S. GUBELMANN,
DECEASED
BY WALTER S. GUBELMANN,
EXECUTOR
BY Burgess, Ryan & Hicks
ATTORNEY

United States Patent Office 3,190,394
Patented June 22, 1965

3,190,394
SPRING MOTOR, WITH MOTOR REWIND FOR CALCULATING MACHINES AND THE LIKE
William S. Gubelmann, deceased, late of Convent, N.J., by Walter S. Gubelmann, executor, Oyster Bay, N.Y., assignor to Realty & Industrial Corporation, Morristown, N.J., a corporation of Delaware
Application Oct. 7, 1960, Ser. No. 61,322, now Patent No. 3,098,609, dated July 23, 1963, which is a division of application Ser. No. 194,273, Nov. 6, 1950, now Patent No. 2,969,177, dated Jan. 24, 1961. Divided and this application Nov. 21, 1962, Ser. No. 239,380
9 Claims. (Cl. 185—40)

This application is a division of copending application, Serial No. 61,322, filed October 7, 1960, for Calculating Machine Driving Mechanism and the Like, now issued July 23, 1963, as Patent No. 3,098,609, which in turn is a division of patent application, Serial No. 194,273, filed November 6, 1950, for Partial Product Calculating Machine, now issued January 24, 1961, as Patent No. 2,969,-177.

This invention relates to motive power means for calculating machines and the like which may require generally instantaneous power and may require greater motion at one instant than at another.

More specifically, the invention relates to automatically powered motor means which continually exerts drive forces on each of several driving units, each of which operates a different mechanism upon actuation of initiating keys appropriate to that driving unit, each of such mechanisms include controls operable automatically for initiating sequential and at times overlapping operations of others of the driving units.

An object of the invention is to provide a machine in which there is a power drive shaft coupled to a motive source through a spring-type energy accumulator, the construction being such as to employ the motive source to maintain the energy accumulator at all times in a state of readiness to turn the power drive shaft without the need for continuously running the motive source.

Another object of the invention is to provide, in business machines and the like, a drive mechanism including a spring motor, and electric motor means for automatically winding the spring motor according to control by circuit control means responsive to winding and unwinding of the spring motor for proper operation of the machine, and a manually operable crank means for winding the spring motor when the electrical current supply fails or is otherwise not available.

Still another object of the invention is to provide, in business machines and the like, novel drive mechanism comprising a spring motor automatically wound for providing instantaneous power for operating the machine through several distinct operations before requiring rewinding, a quiet relatively slow starting electric motor for winding the spring motor, and electric motor controls responsive to winding and unwinding of the spring motor for controlling the electric motor and thereby maintaining suitable tension in the spring motor between predetermined high and low tension limits.

An object of the invention is to provide a novel and improved calculating machine in which there are several discrete mechanisms, operable independently, a spring type actuator common to said mechanisms and normally in wound condition for operating said mechanisms through several cycles of operation, and a motive source coupled to said actuator for restoring said actuator to wound condition, said motive source being brought into operation automatically by said actuator when said actuator unwinds a predetermined extent.

Another object of the invention is to provide a novel and improved calculating machine in which there is a main power drive shaft connected to a wound spring energy accumulator which in turn is coupled to a motive source for being maintained thereby in a substantially wound condition to drive the shaft, the device including a plurality of discrete drive units carried by the main power drive shaft and means drivingly coupling the drive units with the power drive shaft for being turned thereby selectively individually, or in combinations or groups for driving any section or sections of the calculator as needed for various computation operations.

Still a further object of the invention is to provide a novel and improved calculator of the type described, in which the main power drive shaft extends through a number of coaxial sleeved-based drive units each being intended for actuating its own related mechanism, such as for multiplication and division computation and for carriage shifting, the construction being such as to allow the main drive shaft to turn only when any one of the drive units or combinations thereof are unblocked for being rotated by the main shaft, and so that blocking of all the drive units against rotation simultaneously blocks turning of the main drive shaft, thereby conserving the stored energy provided for rotating the main shaft and hence making it feasible to employ a spring-type energy accumulator for driving the main shaft, and to use a relatively small compact slow-starting type of electric motor for automatically and only periodically operating the spring motor for restoring the spring to suitable wound condition.

The above and other objects and advantages of the invention will be more readily understood upon reference to the following disclosure. It will be apparent, however, that those skilled in the art will be enabled to apply the teachings of this disclosure to various modifications as intended to be covered by the scope of the appended claims. The specification is directed to an exemplary embodiment of the invention as illustrated in the accompanying drawings wherein:

FIGURE 4 is a sectional left side elevation taken substantially on plane 4—4 of FIGURE 1, and showing a spring motor for driving the main drive shaft also shown in FIGURE 2, means for rewinding the spring and an automatic control for starting and stopping rewinding operations;

FIGURE 5 is a front elevation as seen from the right of FIGURE 4 principally of the spring motor and the rewinding means shown in FIGURE 4;

FIGURE 6 is a sectioned front elevation of the spring motor taken on plane 6—6 of FIGURE 4, the view omitting part of the inner coil spring for clarity;

FIGURE 7 is a fragmentary perspective view of the rewinding gears and coupling means therebetween;

FIGURE 8 is a fragmentary perspective view of the gear train of the spring motor and rewinding means;

The machine in which the present invention is embodied is disclosed in detail in the afore-mentioned copending application, Serial No. 61,322, of which this application is a division, and in the afore-mentioned now issued parent Patent N. 2,969,177, to which reference may be had for a complete disclosure of various details not otherwise set forth herein. A brief summary of the machine and its operations, however, is presented herewith in order to facilitate understanding of the invention and its interaction with various mechanisms of the machine.

Figure 1:
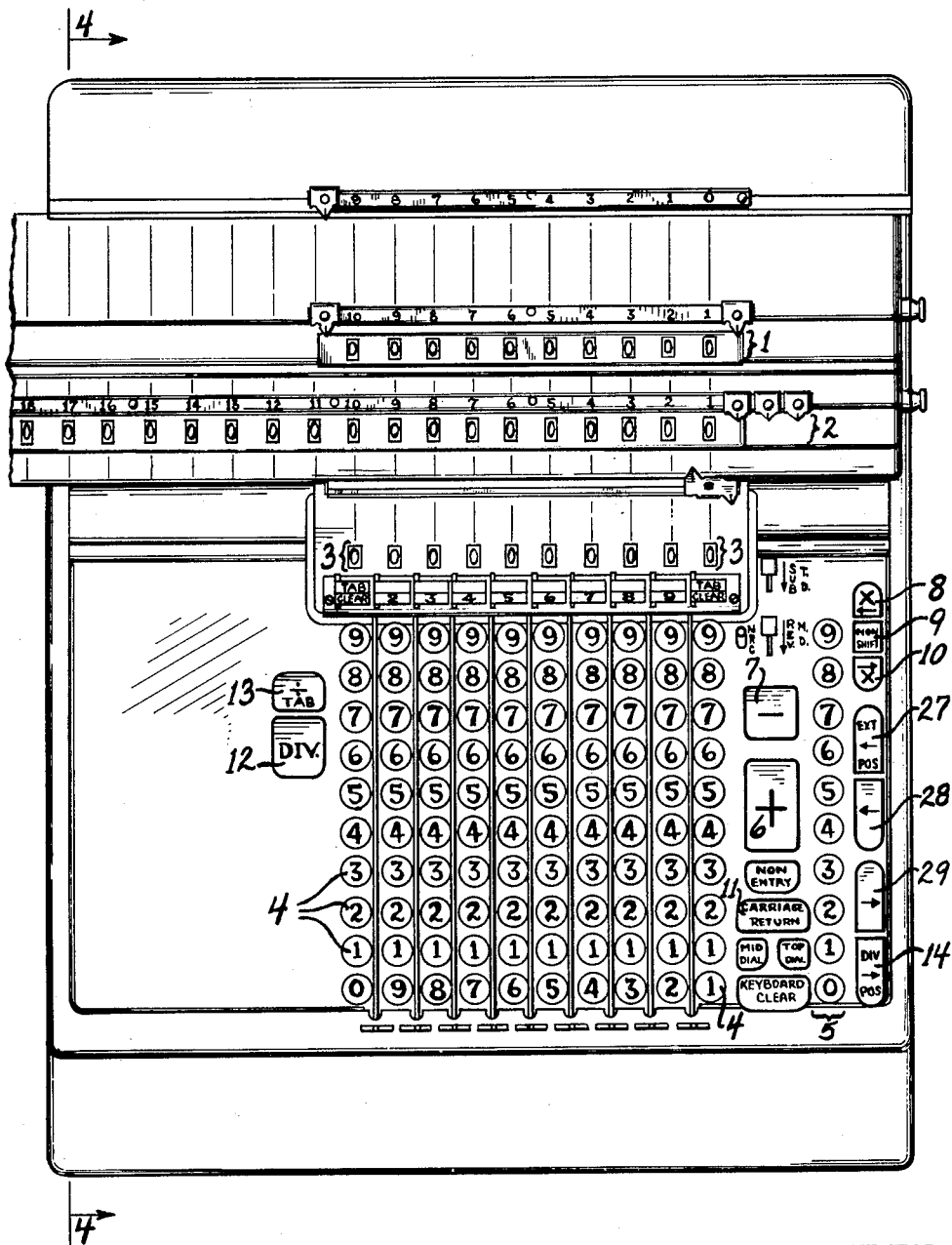
FIGURE 1 is a keyboard face view of a calculating machine embodying the invention, the carriage being shown in fragment in its leftmost position.

The calculating machine as shown in FIGURE 1 embodies predetermined partial product and quotient representations in a multiplying and a dividing mechanism respectively. It also has a shiftable carriage which carries the accumulator registers 1 and 2, with a carriage shifting mechanism; several banks of keys 4 for setting up factors in various computations; and a bank of multiplier keys 5, each of which serves to initiate a multiplying cycle of operations. It also includes an addition initiating key 6, a subtraction initiating key 7, division initiating keys 12 and 13, and carrage shifting keys 14, 27, 28 and 29. The machine further has a tabulating mechanism, an automatically powered motor, and three actuating units which are constantly urged rotatively by the drive mechanism for actuating the multiplying, dividing, and carriage shifting mechanisms. Hereinafter, for convenience and clarity, each of the actuating units is referred to respectively as the multiplying, dividing, or carriage power or the respective drive unit, as the case may be.

Results and factors of the various computations are indicated in ordinally disposed dials or number wheels of registers 1, 2 and 3 as follows: Register 1, carried by the carriage, can indicate the multiplier, quotient, or the number of items in addition or subtraction, as the case may be and, alternatively, the complement of any of the foregoing. Register 2, also carried by the carriage, can indicate the product, dividend, sum, difference, or such complements thereof as are desired. Stationary register 3 shows for easy reading a currently set up factor on keys 4. The numerals on the number wheels are visible through suitable apertures on the respective overlying cover plates.

This machine is of the type commonly known as a "four rules calculator," and performs the arithmetical calculations of addition, subtraction, multiplication and division automatically.

Multiplication by this machine is direct, as distinguished from repeated addition in that the machine multiplies in a manner closely analogous to the operational method used in mental computations. Representations of products for digits 0 to 9 times 1 to 9 are provided on multiplication plates which are selected and set-up respectively in accordance with the separate digits of the multiplicand and each multiplier digit. The partial products thus obtained are integrated into the final product. Depression of a key 4, value 1 to 9 in a bank selects the products of that value times the digits 1 to 9. Each multiplier key 5 for values 1 to 9 serves as an initiatory control for effecting operation of the computing or multiplying mechanism and exercises a control over the same for setting up the multiplicand digit selected multiplication element according to the value of the multiplier key, so that the pertinent partial products (units and tens representations) on each plate are at sensing positions.

The multiplying or computing mechanism includes means for sensing and integrating the values of the set-up representations and entry means controlled thereby for operating registers 2 and 1 to indicate the product and multiplier respectively. A cycle of multiplying operations also includes the operation of automatically initiating an ordinal shift of the carriage. Depression of the "0" value key 5 initiates an ordinal shift of the carriage without first having to excite the computing mechanism.

Addition and subtraction calculations are performed by automatically treating the factors thereof as multiplicands and multiplying the factors by "1." Add key 6 and subtract key 7 are in effect "1" value multiplier keys, but the cycles of operations instituted thereby do not include the operation of automatically initiating a shift cycle. The product thus obtained of a subtrahend is registered subtractively by the dials of the register therefor. Selective means is also provided for effecting subtractive registration of other products.

Selectively presettable keys 8, 9 and 10 are provided for controlling the direction of shift and non-shift of the carriage, as for multiplication. With key 8 in depressed position, the automatic ordinal shift of the carriage will be leftward, but with key 10 in depressed position instead, the ordinal shift of the carriage will be rightward, as indicated by the arrows on those keys. In each instance the carriage will shift in the opposite direction to a preselected start position with the use of the carriage return key 11. With key 9 in depressed position, the automatically operated shift initiating means is normally disabled.

Figure 2:
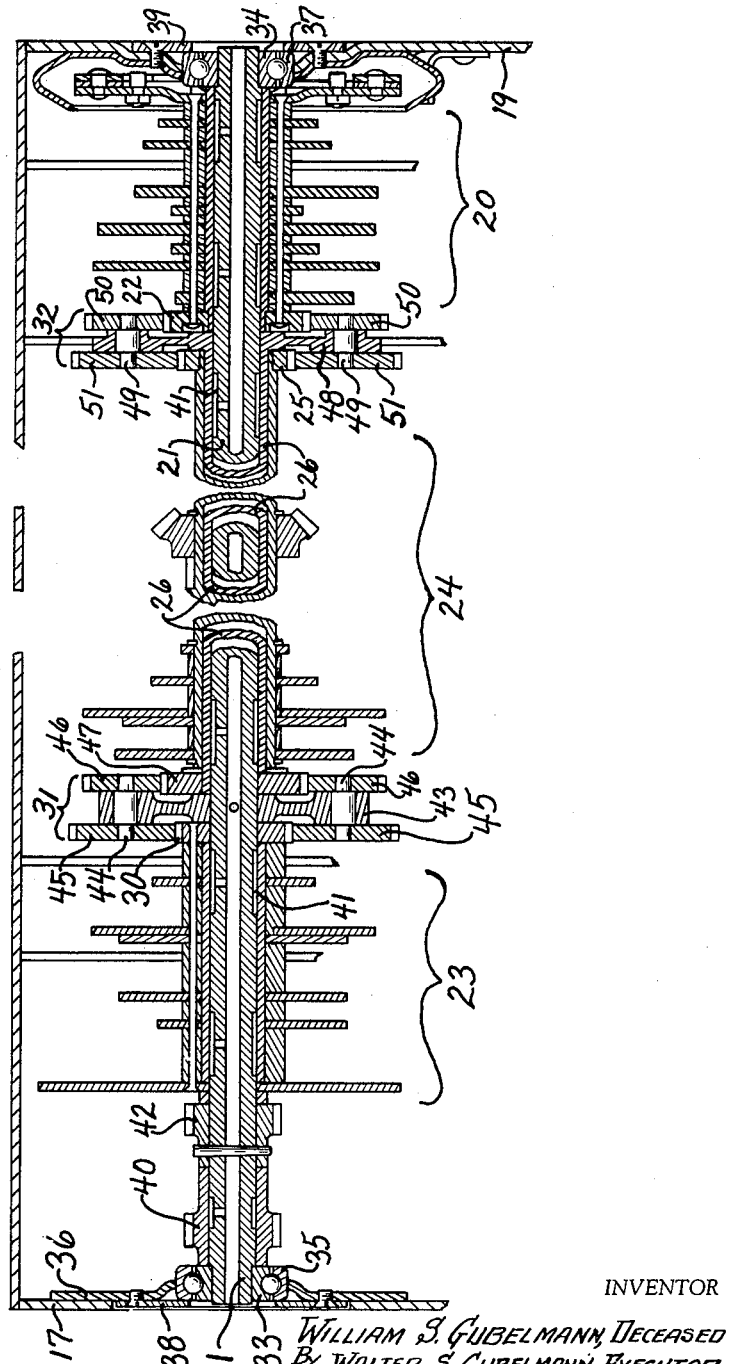
FIGURE 2 is a fragmentary sectioned view of the drive shaft, and including, among other parts, three power units, two differentials for connecting the drive units with the shaft, and a governor for one of the drive units.

The main driving mechanism comprises journaled shaft 21, FIGURE 2, driving means (not shown here) for constantly urging the shaft to rotate, three power units, multiplying 20, carriage 24, and dividing 23, which are rotatably mounted on the shaft, and differentials 31 and 32 for so connecting the power units and the shaft that each power unit may, upon liberation, rotate either individually or concurrently with another of the units.

Shaft 21 has inner ball-bearing races 33 and 34 secured to its left and right ends respectively. Race 33 is received in an outer bearing race 35 supported in a suitable opening on bracket 36 which is fastened to frame plate 17. Race 34 is received in an outer race 37 which is mounted in a suitable hole on frame member 19. Displacement of shaft 21 leftward and rightward is prevented respectively by races 33, 35 and races 34, 37. The races 35 and 37 are supported against endwise thrust respectively by plate 38, secured to bracket 36, and by plate 39, fastened to frame member 19.

Power units 20 and 23, and sleeve 26 on which carriage power unit 24 is rotatably mounted, are mounted for rotation on shaft 21 by antifrictional means 41. Gear 40, also rotatable on the shaft 21, is disposed between race 33 and pinion gear 42 which is secured to the shaft as by the radial pin shown. Both gears will be described presently with more particularity in connection with the driving or motor means.

Division power unit 23 is situated between gear 42, and diametral lever 43 of differential 31. As seen best in FIGURES 2 and 3, lever 43 is secured to the shaft 21 for rotation therewith and supports a rotatable axle 44 at each of its ends. A gear 45 and gear 46 are secured respectively to the left and right ends of each axle 44. Gears 45 are of a larger diameter than gears 46. Gears 45 are meshed with gear 30 of the division power unit 23 and gears 46 are meshed with gear 47 secured to the left end of sleeve 26. The other end of sleeve 26 has diametral lever 48 of differential 32 secured thereto. This lever also supports a journaled axle 49 at each of its ends. A gear 50 and gear 51 are secured respectively to the right and left ends of each axle 49. Gears 50 are of a smaller diameter than gears 51 which are meshed with gear 25 of the carriage power unit 24. Gears 50 are meshed with gear 22 which is secured to the left end of multiplying unit 20.

Figure 3:
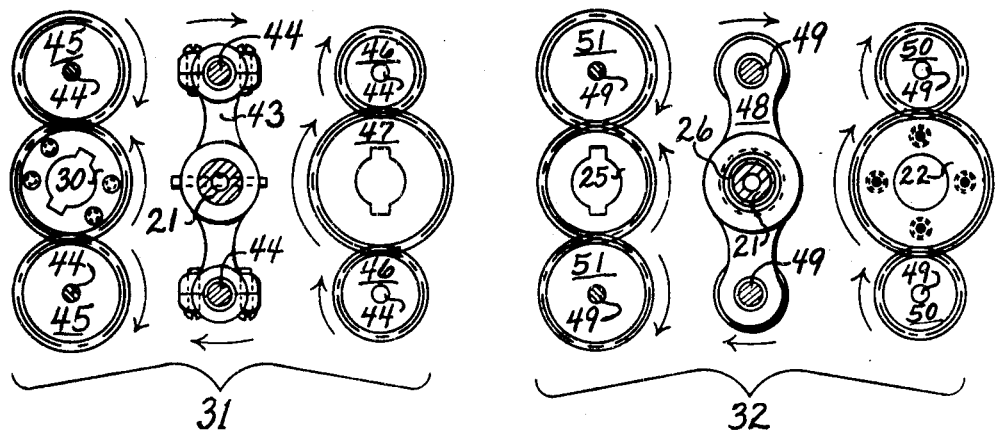
FIGURE 3 is a fragmentary sectional right side view of two differentials of the driving mechanism.

Whenever rotation of all of the three power units 20, 24 and 23 is prevented, shaft 21 is also held against rotation. The ratios between gears 25, 51, 50 and 22 are such that when both gears 22 and 25 cannot rotate, the diametral lever 48 secured to sleeve 26 cannot be rotated. Hence, the gear 47 secured to the other end of sleeve 26 is also held against rotation when both units 20 (multiplying) and 24 (carriage shifting) are held against rotation. In a simillar manner the ratios between gears 47, 46, 45 and 30 are such that when gears 47 and 30 are held against rotation, the diametral lever 43 cannot be rotated, and since lever 43 is secured to shaft 21, as by the radial pin shown in FIGURE 3, the constantly urged longitudinal shaft 21 is prevented from rotating. Upon liberation of any one of the three power units, shaft 21 rotates clockwise, as when viewed in FIGURE 3. Assuming that the division power unit 23 is the one liberated and that the multiplying and carriage power units 20 and 24 are held, the division power unit with its gear 30 is free to rotate and gear 47 is held. Diametral lever 43 swings clockwise with shaft 21 as seen in FIGURE 3, causing gears 46 to rotate and revolve clockwise about held gear 47. Consequently gears 45 also rotate and revolve clockwise, but the ratios of the gears are such that gear 30 is rotated counter-clockwise as indicated by the arrow in FIGURE 3.

If the division power unit 23 is held and either the carriage shifting unit 24 or multiplying power unit 20 is liberated, then gear 30 is stationary and gear 47 is free to rotate as shaft 21 rotates. At such times the clockwise swing of lever 43 as seen in FIGURE 3 causes clockwise planetation of gears 45 about the held gear 30. Hence gears 46 will also rotate clockwise and tend to rotate gear 47 counter-clockwise. However, the ratios among gears 30, 45, 46 and 47 are such that the gear 47 will respond to a greater extent to the planetation of gears 46 and will definitely rotate clockwise instead.

At times the multiplying power unit 20 or carriage power unit 24 is liberated while the division power unit 23 is operating. When both gears 30 and 47 are free to rotate, the resistance of each liberated unit and the ratio differences between the gears 47, 46, 45 and 30 are such that as the diametral lever 43 swings clockwise, as seen in FIGURE 3, planetation of gears 46 and 45 is effected whereby gear 30 (division power unit) is rotated counter-clockwise, and gear 47 (carriage shifting or multiplying power unit) is rotated clockwise. Whenever the carriage shifting or multiplying power units are liberated, the gear 47 and lever 48 are rotated clockwise as explained. If the carriage shifting unit 24 is the one liberated and the multiplying unit 20 is held, gear 25 is free to rotate and gear 22 is stationary. At such times, the clockwise swing of lever 48 will cause clockwise planetation of gears 50 about gear 22. Gears 51 will also rotate and revolve as gears 50, but the ratios of the gears are such that gear 25 will rotate counter-clockwise as seen in FIGURE 3 in response to rotation of gears 51. When gear 25 is held and gear 22 is free to rotate, the clockwise swing of lever 48 will cause planetation of gears 51 clockwise about gear 25 and the gears 50 will tend to rotate the gear 22 counter-clockwise, but the ratios among gears 25, 51, 50 and 22 are such that the gear 22 will actually rotate clockwise in response to the planetation of gears 50 with the lever 48.

As also described in the previously mentioned parent patent application and patent and in the copending patent application, the carriage power unit 24 may be liberated while the multiplying power unit 20 is operating. At such times, both gear 25 and gear 22 are free to rotate. The resistances of the liberated units and the ratio differences of the gears 25, 51, 50 and 22 are such that as the lever 48 swings clockwise, planetation of gears 50 and 51 is effected whereby gear 25 (carriage power unit) is rotated counter-clockwise and gear 22 (multiplying power unit) is rotated clockwise.

Shaft 21 is rotated counter-clockwise (as seen in FIGURE 4) by a spring powered motor in which the spring 52 may be rewound manually or automatically. Referring to FIGURE 6, the spring motor comprises shaft 53 journaled on main machine frames 17 and 18, a gear 54 secured to the shaft by key 55, another gear 56 rotatably mounted on the shaft and a flat type spring 52 between the gears and coiled about the hub 57 of gear 54. The inner end of the spring is hooked on to stud 58 on the hub, and the outer end of the spring is hooked in slot 59 on casing 60 formed on gear 56. The rim of casing 60 is received in a recess therefor on gear 54. Thus a drum is formed for the spring 52 which is so wound and tensioned as to rotate the gear 56 (FIGURE 4) clockwise for counter-clockwise rotation of meshed gear 42 and shaft 21. Spring 52 also tends to rotate gear 54 counter-clockwise, but such rotation of gear 54 is prevented, as will be explained. Clockwise rotation of gear 54 rewinds the spring 52.

For reloading the spring 52 manually, the left end of shaft 53 (FIGURE 6) is formed with a threaded hole to receive the illustrated threaded end portion (right hand threads) on a crank 61. Clockwise turning of crank 61 (FIGURE 4) will rotate shaft 53 and the gear 54 keyed thereto clockwise.

For automatic reloading of spring 52, a small conventional electric motor 62 may be utilized. As will be described presently, means are provided for starting such a motor when the spring unwinds a certain extent and for stopping the motor when the spring is rewound a predetermined extent. The electric motor 62 is mounted on a frame plate 15 and has gear 63 secured to its rotor 64. Gear 63 is meshed with gear 65 rotatably mounted on shaft 66 which is fixed on frame members 17 and 18, FIGURE 5.

Referring again to FIGURE 4, clockwise rotation of gear 63 will rotate gear 65 counter-clockwise. Gear 65 carries a pawl 67 pivoted at 68. Spring 69, fastened to the pawl and to stud 70 on the gear 65, urges the pawl counter-clockwise into engagement with a ratchet wheel 71 which is secured to a gear 72, FIGURE 7. Gear-wheel unit 72-71 is rotatably mounted on hub 73 of gear 65, and the gear 72 is meshed with rewinding gear 54, FIGURE 8. The engagement between pawl 67 (FIGURE 7), and ratchet wheel 71 is such that as gear 65 (FIGURE 4) is rotated counter-clockwise by the motor 62, the ratchet wheel-gear unit 71-72 is also driven counter-clockwise, whereby the gear 54 is rotated clockwise to rewind the spring 52. Through pawl 67, the clockwise urgence of gear 72 by spring influenced gear 54 tends to drive gear 65 clockwise. Also, when the gear 72 is rotated counter-clockwise, as in response to the manual clockwise rotation of gear 54, by crank 61, pawl 67 merely ratchets on the ratchet wheel 71. Hence, at such times gear 65, which is yieldably held against counter-clockwise rotation, as will be described, and the rotor 64 of the electric motor 62 are not actuated. A detent brake means 74, pivoted on stud 75 on frame 17, FIGURE 7, is urged into engagement with gear 65 by torsion spring 76, fastened to the detent and to stud 77 on frame plate 17. The detent 74 is formed with teeth 78 (FIGURE 4) for so engaging the gear 65 that only clockwise rotation of gear 65 (as in response to urgence of spring 52) is blocked. When gear 65 is turned counter-clockwise, gear 65 coacts with teeth 78 so as to rock the detent clockwise. The teeth 78 as seen in FIGURE 4 are shaped for this purpose. The tension of spring 76 is sufficient to hold gear 65 while pawl 67 and wheel 71 are ratcheting during manual rewinding of spring 52.

An electromagnetic means or solenoid 79, secured to the frame of the machine, is provided for holding detent 74 disengaged from gear 65 during automatic rewinding. The electromagnetic means is energized, as will be explained, from the time the electric motor 62 is started until it is stopped. Also, at the outset of each operation of the motor, the detent 74 is rocked clockwise, as explained, due to the shape of teeth 78, which movement is sufficient to move ferrous tab 80 formed on the detent into the magnetic field of the magnet means 79, whereupon magnet means 79 then draws the detent further clockwise so that teeth 78 are not in contact with gear 65. Thus the frictional restraint of detent 74 against counter-clockwise rotation of gear 65 is removed early in an automatic rewinding operation and ratcheting is prevented.

Figure 10:
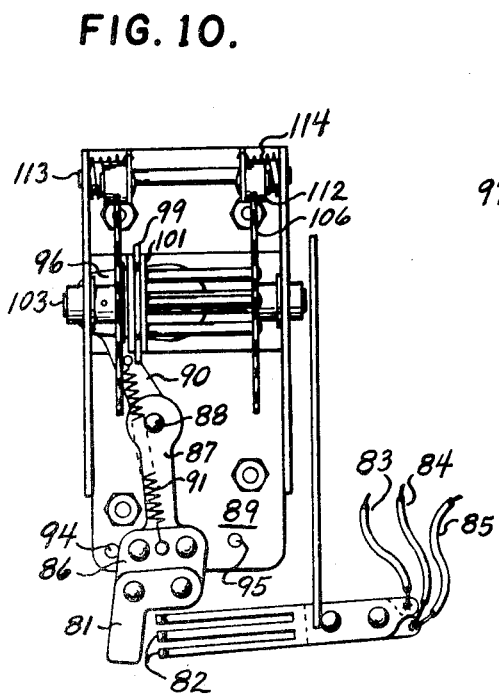
FIGURE 10 is a front elevation of the automatic rewinding control.

Operation of electric motor 62 and energization of magnetic means 79 is controlled, in one preferred form, by a tension control means comprising, primarily, an automatically operated toggle switch mechanism. Referring to FIGURE 10, 81 represents the switch blade that is received between pairs of spring contacts 82 so as to simultaneously close the circuit from 83 through wires 84 and 85 to the electric motor and the magnet means 79 respectively. Contacts 82 are mounted on rear frame 16 (FIGURE 4) and are insulated therefrom, and switch blade 81 (FIGURE 10) is fastened to switch member 86 which is secured to the free end of switch lever 87. Member 86 is formed of any suitable non-conducting material. The other end of lever 87 is mounted pivotally on stud 88 on bracket 89 which is secured to rear frame 16, FIGURE 4.

Figure 11:
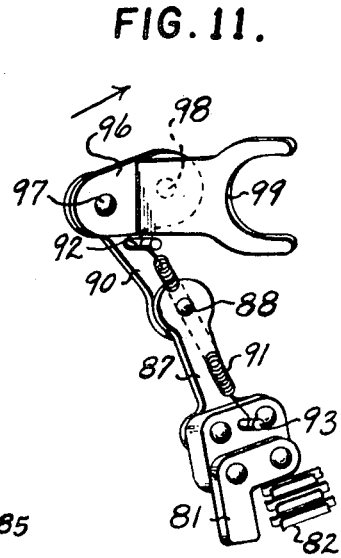
FIGURE 11 is a fragmentary perspective view of some of the elements shown in FIGURE 10.

An upwardly extending lever 90 (FIGURE 11) is also pivoted on stud 88, and spring 91 is fastened to studs 92 and 93 on levers 90 and 87 respectively. Spring 91 (FIGURE 10) serves to swing the lever 87 and switch blade 81 rightward from the normal position shown in FIGURE 10 to close the circuits, and to swing them leftward, back to normal position, to open the circuits when the lever 90 is moved sufficiently to carry the spring past pivot 88 respectively rightward in response to unwinding of the main spring 52 and leftward in response to the rewinding of the main spring. Studs 94 and 95 on bracket 89 are provided for limiting the extent of leftward and rightward movement of lever 87.

Figure 9:
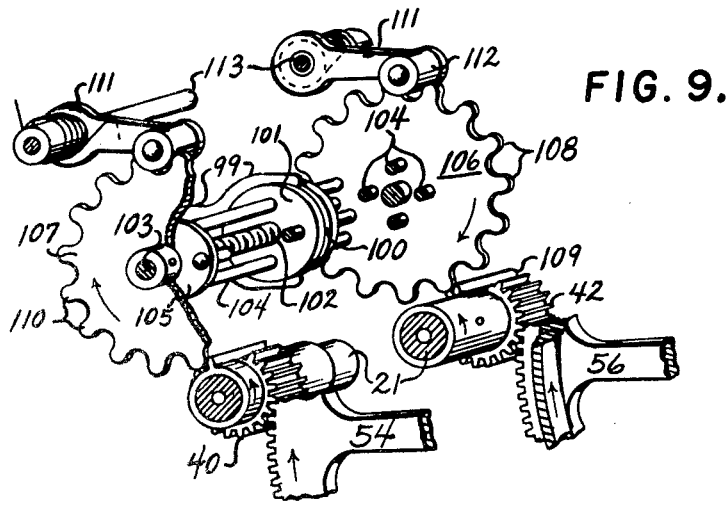
FIGURE 9 is a fragmentary sectioned perspective view of part of the automatic rewinding control.

One end of a lateral link 96 is pivotally connected at 97 (FIGURE 11) to the upper end of lever 90 and the other end of the link is pivotally connected at 98 to bifurcated member 99. The furcations on member 99 extend forwardly so as to be received in an annular groove 100 (FIGURE 9) on disc 101. The arrangement is such that a predetermined extent of rectilinear movement of the disc 101 rightwardly and then leftwardly will actuate lever 90, FIGURE 11, to respectively effect "on" and "off" switching of the circuits.

Disc 101 (FIGURE 9) is threaded to receive screw portion 102 on shaft 103 which is journaled on bracket 89, FIGURE 10. Disc 101 is also mounted slidably on rods 104 (FIGURE 9) spaced radially from shaft 103 and parallel thereto. The rods 104 are secured at their ends on collar member 105 and toothed wheel 106 which are mounted rotatably on shaft 103 respectively to the left and right of the screw portion.

Thus parts 106, 104 and 105 are formed as a rotatable unit for turning disc 101 clockwise, as will be described. Another toothed wheel 107, similar to 106 is secured to shaft 103 toward its left end for rotating the shaft clockwise. The cooperation between the disc 101 and the shaft is such that clockwise rotation of the disc forwardly of the shaft causes the disc to travel rightwardly and clockwise rotation of the shaft forwardly of the disc effectuates leftward traverse of the disc.

Wheel 106 is formed with teeth 108 about its periphery and is so aligned with gear 42 that the teeth 108 cooperate with axially elongated tooth or cog 109 on the gear. During each counter-clockwise revolution of gear 42 in response to unwinding of the main spring, cog 109 engages one of the teeth 108 to turn wheel 106 clockwise a certain angular amount. The ratios between the screw 102, disc 101, wheel 106 and gear 42 are such that the disc will traverse rightwardly sufficiently to initiate rewinding operations before the main spring is fully unwound or expended.

Thus continuous cycling of the machine is made possible. Wheel 107 is formed with teeth 110 about its periphery, and is in alignment with gear 40 which also carries a cog. The relationship between wheel 107 and gear 40 is similar to that between wheel 106 and gear 42. As the gear 40 rotates counter-clockwise in response to rewinding operations, wheel 107 is rotated clockwise by the cog to traverse the disc 101 leftwardly to open the circuits, thereby to terminate the rewinding operation at about the time the main spring is fully rewound.

A detent 111 is provided for each wheel 106 and 107 to prevent random movements of the wheels. Both detents are alike, hence the description of one will also explain the other. The detent for wheel 106 is formed of a lever 111 with a roller 112 mounted on its forward end. The lever is piovtally mounted on shaft 113 which is secured on bracket 89, FIGURE 10, and the roller 112 overlies the wheel 106. A torsion spring 114 is fastened to the lever and the bracket for urging the lever clockwise to hold roller 112 (FIGURE 9) in contact with wheel 106. During the latter part of each actuation of the wheel by gear 42, the roller 112 cooperates with teeth 108 to urge the wheel clockwise to that position in which tooth 109 will engage a tooth 108 in an ensuing revolution of gear 42.

In this manner, it is seen that the constant energy replenishment by rewinding of the spring 52 causes the spring powered motor to act as an energy accumulator and hence ready at all times to instantly drive the main power shaft 21. Also, continuous rotation of main shaft 21 is possible without the need for running the motive source, such as motor 62, at all times.

Although a detailed description of a preferred embodiment of the invention has been set forth herein, it is understood that various changes may be made in size, shape, materials and arrangement, within the spirit and scope of the invention, and that applicant does not wish to be limited by the description, but only by the scope of the appended claims.

What is claimed is:

1. A main operating mechanism for a calculating machine having a frame, said operating mechanism comprising a shaft journaled on said frame; an input gear secured to said shaft for rotating therewith; an output gear spaced axially from said input gear and rotatably mounted on said shaft; a spring coiled about said shaft and fixed at its inner end to said input gear and fixed at its outer end to said output gear for being wound upon rotation of said shaft relative to said output gear and for effecting rotation of said output gear; manually turnable crank means releasably engageable with said shaft for rotating said shaft and thereby to manually wind said spring; motor means for winding said spring automatically; a gear train connecting said motor means with said input gear for rotating said input gear, said gear train comprising a pinion carried by said motor means and rotatable thereby, and first and second coaxial gears, said first coaxial gear being meshed with said pinion and said second coaxial gear being meshed with said input gear, a ratchet wheel secured to said second coaxial gear for rotation therewith, pawl means pivotally mounted on said first coaxial gear for rotary movement therewith and releasably engaging said ratchet wheel for rotating said second coaxial gear in unison with said first coaxial gear whenever said motor means is rotated, said pawl means permitting rotation of said second coaxial gear forwardly relative to said first coaxial gear whenever said input gear is rotated manually by said crank means; a detent pivotally mounted on said frame and normally engaging said first coaxial gear for holding said first coaxial gear against rotation; a normally deenergized electromagnetic means for disengaging said detent from said first coaxial gear upon commencement of automatic winding of said spring by said motor means and energization of said electromagnetic means; circuit means connected to said motor means and said electromagnetic means for connecting them to an electric power source, and a normally open switch means interposed in said circuit means and operable responsive to said output gear upon a predetermined amount of rotation thereof by said spring for closing said circuit means for operating said motor means and energizing said electromagnetic means, and operable responsive to said input gear upon a predetermined amount of rotation thereof by said motor means for opening said circuit to said motor means and to said electromagnetic means for de-energizing said motor means and electromagnetic means.

2. A drive mechanism for a calculating machine having a frame, said drive mechanism comprising a shaft journaled on said frame, an input gear secured to said shaft for turning therewith; an output gear spaced axially from said input gear and rotatably mounted on said shaft; a spring coiled about said shaft between said input and output gears and fixed at its inner end to said input gear and fixed at its outer end to said output gear for being wound upon rotation of said input gear relative to said output gear and for effecting rotation of said output gear; crank means engageable with said shaft for rotating the same for manually winding said spring; motor means for winding said spring automatically; circuit means connected to said motor means and connectable to a source of electric current; a gear train connecting said motor means with said input gear, said gear train comprising a pinion carried by said motor and rotatable thereby, and first and second coaxial gears, said first coaxial gear being meshed with said pinion and said second coaxial gear being meshed with said input gear, a ratchet wheel secured to said second coaxial gear for rotation therewith, pawl means carried pivotally on said first coaxial gear and engaging said ratchet wheel for rotating said second coaxial gear in unison with said first coaxial gear when said first coaxial gear is rotated by said motor means, said pawl means permitting said second coaxial gear to rotate forwardly relative to said first coaxial gear during manual winding of said spring; a detent pivoted on said frame and engaging said first coaxial gear for holding said first coaxial gear against reverse rotation in response to said spring; a normally open switch means interposed in said circuit means and operable responsive to a predetermined amount of rotation of said second gear for closing said circuit means for operating said motor means, and responsive to said input gear upon a predetermined amount of rotation thereof for opening said circuit means for stopping operation of said motor means.

3. A drive mechanism for a calculating machine having a frame, said drive mechanism comprising a shaft journaled on said frame, an input gear secured to said shaft for rotation therewith, an output gear spaced axially from said input gear and rotatably mounted on said shaft, a spring coiled about said shaft between said input and output gears and fixed at its inner end to said input gear and at its outer end to said output gear for rotating said output gear and for being wound upon rotation of said input gear relative to said output gear; motor means for winding said spring; a gear train connecting said motor means with said input gear and comprising a drive gear; a detent pivotally mounted on said frame and engaging said drive gear for normally holding said gear train and said input gear against rotation; a normally de-energized electromagnetic means for disengaging said detent means from said drive gear upon commencement of winding of said spring by said motor means and energization of said electromagnetic means; circuit means connected to said motor means and said electromagnetic means for connecting them to an electric power source, and a normally open switch means interposed in said circuit means and operable responsive to said output gear upon a predetermined amount of rotation of said output gear by said spring for closing said circuit means for operating said motor means and energizing said electromagnetic means, said switch means being operable responsive to said input gear upon a predetermined amount of rotation of said input gear by said motor means for opening said circuit means again, thereby to stop operation of said motor means and de-energize said electromagnetic means.

4. A driving device for calculating machines, comprising a shaft supported for rotation, an input gear secured to said shaft for rotation therewith, an output gear spaced axially from said input gear and rotatably mounted on said shaft, a spring coiled about said shaft between said gears and fixed at its inner end to said input gear and at its outer end to said output gear for rotating said output gear and for being wound upon rotation of said input gear relative to said output gear; a motor for winding said spring; a gear train connecting said motor with said input gear and comprising a drive gear; a pivoted detent releasably engaging said drive gear for therethrough blocking reverse rotation of said input gear and of said gear train by said spring; circuit means connected to said motor for connecting the same to an electric power source; a normally open toggle switch interposed in said circuit means; an output shaft supported for rotation; first and second pinions meshed with said input and output gears respectively, said first pinion being rotatably mounted on said output shaft and said second pinion being fixed to said output shaft; a first cog carried by said first pinion for rotation therewith, a second cog carried by said second pinion for rotation therewith; a switch shaft mounted for rotation; a first wheel secured to said switch shaft and comprising a plurality of teeth projections so disposed in the path of rotation of said first cog that once in each revolution of said first pinion said first cog engages a said tooth projection of said first wheel and rotates said first wheel a predetermined extent; a second wheel rotatably mounted on said switch shaft and comprising a plurality of teeth projections so disposed in the path of rotation of said second cog that once in each revolution of said second pinion said second cog engages a tooth projection of said second wheel and rotates said second wheel a predetermined extent; a collar rotatably mounted on said switch shaft and spaced from said second wheel, a plurality of longitudinally extended rods for securing said collar to said second wheel for rotation of said collar in unison with said second wheel; said switch shaft being threaded between said collar and said second wheel, a disc slidably mounted on said rods for traversing therealong and for being rotated by said rods together with said second wheel, said disc being formed with an annular groove about its periphery and with a threaded bore for threadedly engaging said threaded portion of said switch shaft so that whenever said second wheel rotates relative to said first wheel said disc is caused to traverse axially in a first direction and whenever said first wheel rotates relative to said second wheel said disc is caused to traverse axially in a second direction, opposite to said first direction, and a yoke means connected to said toggle switch and engaging said disc in said groove for being traversed selectively thereby in said first and second directions for operating said switch to close said circuit upon a predetermined extent of traverse of said disc in said first direction and to open said circuit means upon a predetermined extent of traverse of said disc in said second direction.

5. A drive mechanism for a calculating machine having a frame, said drive mechanism comprising a shaft journaled on said frame; an input gear secured to said shaft for rotation therewith; an output gear spaced axially from said input gear and mounted on said shaft for rotation thereon; a drive spring coiled about said shaft between said input and output gears and fixed at one end to said input gear and fixed at its other end to said output gear for being wound upon rotation of said input gear relative to said output gear for effecting rotation of said output gear; crank means engageable with said shaft for manually rotating said shaft to wind said spring; electric motor means for winding said spring automatically; circuit means connected to said motor means and connectable to a source of electric current; a gear train connecting said motor means with said input gear, said gear train comprising a pinion carried by said motor and rotatable thereby, and first and second coaxial gears, said first coaxial gear being meshed with said pinion and said second coaxial gear being meshed with said input gear, a ratchet wheel secured to said second coaxial gear for rotating therewith, pawl means carried pivotally on said first coaxial gear and engaging said ratchet wheel for rotating said escond coaxial gear in unison with said first coaxial gear when said first coaxial gear is rotated by said motor means, said pawl means permitting said second coaxial gear to rotate forwardly relative to said first coaxial gear during manual winding of said spring; a detent pivotally carried on said frame and releasably engaging said first coaxial gear for holding said first coaxial gear against reverse rotation in response to said spring; and switch means comprising spaced first and second terminals connected to said circuit, a fixed stud, and a blade pivoted on said fixed stud and rockable between closed circuit and open circuit positions, at said closed circuit position said blade contacting said terminals to interconnect said terminals thereby to energize said motor, and at said open circuit position said blade is disengaged from said terminals thereby disconnecting said terminals from each other and stopping operation of said motor, a blade-moving lever pivoted on said fixed stud, a first lug carried by said switch blade spaced from said fixed stud, a second lug carried by said blade-moving lever spaced from said fixed stud, tensioned spring means connected to said first and second lugs for rocking said blade to open circuit and closed circuit positions in response to angular movement of said blade-moving lever respectively in one direction to one side of said fixed stud and in the opposite direction to the other side of said fixed stud, and means operable by said input and output gears and engaging said blade-moving lever for moving said blade-moving lever in said one direction upon a predetermined amount of rotation of said input gear and for moving said blade-moving lever in said opposite direction upon a predetermined amount of rotation of said output gear.

6. A drive mechanism comprising a spring motor, a spring means in said spring motor, an input member rotatable for intensifying the tension in said spring means, an output member rotatable by the tension in said spring means, a manually turnable crank means releasably engageable with said input member for rotating said input member for manually winding said spring motor, primary motor means operable for rotating said input member for winding said spring motor, a gear train connecting said primary motor means with said input member for rotating said input member, said gear train comprising at least a first gear and a second gear, said first gear being connected with said motor means for rotation thereby upon operation of said motor means and said second gear being connected with said input member for operation therewith, a one-way clutch means between said first and second gears constructed and arranged for rotating said second gear in unison with said first gear whenever said motor means is operated and for permitting rotation of said second gear forwardly of said first gear whenever said input member is rotated manually by said crank means, a detent means normally engaging said first gear for holding said first gear and said motor means against rotation by said spring motor, a normally de-energized electromagnetic means for disengaging said detent means from said first gear upon winding of said spring motor by said primary motor means and energization of said electromagnetic means, circuit means connected to said motor means and said electromagnetic means for connecting them to an electric power source, and a normally open switch means interposed in said circuit means and operable responsive to said output member upon a predetermined amount of rotation thereof by said spring motor for closing said circuit means for operating said primary motor means and energizing said electromagnetic means, and operable responsive to said input member upon a predetermined amount of rotation thereof by said motor means for opening said circuit to said motor means and to said electromagnetic means for de-energizing said motor means and said electromagnetic means.

7. A drive mechanism comprising a spring motor, a spring means in said motor, an input member rotatable for intensifying the tension of said spring means in said spring motor, an output member rotatable by the tension of said spring means in said spring motor, a manually turnable crank means releasably engageable with said input member for rotating said input member for manually winding said spring motor, primary motor means operable for rotating said input member and automatically winding said spring motor, a gear train connecting said primary motor means with said input member for rotating said input member, a one-way clutch means interposed in said gear train for transmitting the torque of said primary motor means whenever said primary motor means is operated and for permitting rotation of said input member forwardly of said primary motor means whenever said input member is rotated manually by said crank means, a detent means normally engaging said gear train for holding said gear train and said motor means against reverse rotation by said spring motor when said primary motor means is not operating, a normally de-energized electromagnetic means for disengaging said detent means from said gear train upon operation of said primary motor means and the energization of said electromagnetic means, circuit means connected to said motor means and said electromagnetic means for connecting them to an electric power source, and a normally open switch means interposed in said circuit means and operable responsive to said output member upon a predetermined amount of rotation thereof by said spring motor for closing said circuit means for operating said primary motor means and for energizing said electromagnetic means, and operable responsive to said input member upon a predetermined amount of rotation thereof by said primary motor means for opening said circuit to said primary motor means and to said electromagnetic means for de-energizing said electromagnetic means and halting operation of said primary motor means.

8. A drive mechanism comprising a spring motor, a spring means in said spring motor, an input member rotatable for intensifying the tension of said spring means in said spring motor, an output member rotatable by the tension in said spring motor, a manually turnable crank means releasably engageable with said input member for rotating said input member for manually winding said spring motor, primary motor means operable for rotating said input member for automatically winding said spring motor, a one-way clutch means between said primary motor means and said input member for transmitting the torque of said primary motor means whenever said primary motor means is operated and for permitting rotation of said input member forwardly of said motor means whenever said input member is so rotated manually by said crank means, a one-way brake means normally connected with said motor means for holding said motor means against reverse rotation by said spring motor when said motor means is not operating, a normally de-energized electromagnetic means for disconnecting said brake means from said motor means upon operation of said motor means and the energization of said electromagnetic means, circuit means connected to said motor means and said electromagnetic means for connecting them to an electric power source, and a normally open switch means interposed in said circuit means and operable responsive to said output member upon a predetermined amount of rotation thereof by said spring motor for closing said circuit means for operating said primary motor means and energizing said electromagnetic means, and operable responsive to said input member upon a predetermined amount of rotation thereof by said motor means for opening said circuit to said motor means and to said electromagnetic means for de-energizing said electromagnetic means and halting said motor means.

9. A drive mechanism comprising a spring motor means having an input member rotatable for intensifying the tension in said spring motor means and an output member rotatable by the tension in said spring motor means, a power source means operable for rotating said input member to wind said spring motor means, a brake means normally engaging said power source means for holding said power source means against reverse rotation by said spring motor means when said power source means is not operating, and a tension control means responsive to said output member upon a predetermined amount of rotation thereof by said spring motor means for disengaging said brake means from said power source means and for starting operation of said power source means, said tension control means being further responsive to said input member upon a predetermined amount of rotation thereof for reengaging said brake means with said power source means and for stopping operation of said power source means.

References Cited by the Examiner
UNITED STATES PATENTS 1,085,477 1/14 Phillips _____ 185—43
2,252,775 8/41 Lichtenstein _____ 185— 40 X JULIUS E. WEST, *Primary Examiner.*
EDGAR W. GEOGHEGAN, *Examiner.*